(12) United States Patent
Okada (10) Patent No.: US 8,608,577 B2
(45) Date of Patent: Dec. 17, 2013

(54) DAMPER DEVICE

(75) Inventor: Takuya Okada, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/639,619

(22) PCT Filed: Apr. 7, 2010

(86) PCT No.: PCT/JP2010/056316
§ 371 (c)(1),
(2), (4) Date: Oct. 5, 2012

(87) PCT Pub. No.: WO2011/125189
PCT Pub. Date: Oct. 13, 2011

(65) Prior Publication Data
US 2013/0023347 A1    Jan. 24, 2013

(51) Int. Cl.
*F16F 15/123*    (2006.01)

(52) U.S. Cl.
USPC ......................................................... 464/68.9

(58) Field of Classification Search
USPC .......... 464/68.1, 68.9, 68.92; 192/212–214.1, 192/55.2–55.7, 200–211; 267/273, 277, 267/286; 188/378–380
See application file for complete search history.

(56) References Cited

U.S. PATENT DOCUMENTS

| | | | |
|---|---|---|---|
| 4,810,231 A | * | 3/1989 | Weissenberger et al. . 192/203 X |
| 6,682,431 B2 | | 1/2004 | Uehara |

FOREIGN PATENT DOCUMENTS

| | | |
|---|---|---|
| JP | 4 337128 | 11/1992 |
| JP | 7 12160 | 1/1995 |
| JP | 10 82440 | 3/1998 |
| JP | 11 230221 | 8/1999 |
| JP | 2002 106639 | 4/2002 |
| JP | 2007 127227 | 5/2007 |
| JP | 2008 138884 | 6/2008 |
| JP | 2009 174720 | 8/2009 |

* cited by examiner

*Primary Examiner* — Gregory Binda
*Assistant Examiner* — Josh Skroupa
(74) *Attorney, Agent, or Firm* — Oblon, Spivak, McClelland, Maier & Neustadt, L.L.P.

(57) ABSTRACT

A damper device includes a first rotation member coupled to an engine; a second rotation member coupled to a drive member driven by power generated from the engine and capable of rotating relative to the first rotation member; and a coil spring configured to transmit the power between the first rotation member and the second rotation member, and absorb a torque variation between the first rotation member and the second rotation member, wherein the coil spring has a hollow portion that is an internal area and an outline portion that is an outer area on a cross-sectional shape on a plane including a centerline of the coil spring, the hollow portion having lower rigidity and lower density than those of the outline portion. Accordingly, the damper device can reduce the influence caused by the centrifugal force.

15 Claims, 9 Drawing Sheets

FIG.12

DAMPER DEVICE

FIELD

The present invention relates to a damper device.

BACKGROUND

As described in Patent Literatures 1 and 2, a damper device is provided between a power source mounted to a vehicle and a drive member that is driven by power generated by the power source, such as a drive wheel. The damper device includes a first rotation member coupled to the power source and a second rotation member coupled to the drive wheel, and a coil spring provided between two rotation members, wherein the first rotation member and the second rotation member are pivotally supported to be relatively rotatable. The damper device transmits power between two rotation members through the coil spring. Accordingly, the damper device is a device for absorbing a torque variation between two rotation members.

As the coil spring applied to the vehicle, there have been coil springs applied with respect to a linear motion of a suspension as described in Patent literatures 3 and 4.

CITATION LIST

Patent Literature

Patent Literature 1: Japanese Patent Application Laid-open No. 2008-138884
Patent Literature 2: Japanese Patent Application Laid-open No. 2009-174720
Patent Literature 3: Japanese Patent Application Laid-open No. 2007-127227
Patent Literature 4: Japanese Patent Application Laid-open No. H07-012160

SUMMARY

Technical Problem

The coil spring reduces the outputted vibration by storing some inputted vibration as energy, and when it is applied to the damper device, it absorbs the torque variation. In order to absorb the torque variation more by the coil spring, i.e., in order to enhance performance of the damper device, it is preferable that a torsional rigidity is decreased to increase energy that the coil spring can store. In order to decrease the torsional rigidity, it is preferable that the size of the coil spring is increased, or the coil spring is arranged at the outside of the two rotation members in the radius direction.

In this case, the damper device generates centrifugal force, since it rotates upon the transmission of power. The coil spring tries to deform by the centrifugal load based upon the centrifugal force such that the outside of the rotation member in the radius direction projects. When the coil spring is supported by the first rotation member and the second rotation member on both ends of the coil spring in a direction of a centerline, and there is a space where the coil spring can move at the outside of the rotation member in the radius direction, the coil spring actually bends toward the outside of the rotation member in the diameter direction by the centrifugal force, so that stress is generated on the coil spring. When there is no space where the coil spring can move at the outside of the rotation member in the diameter direction, the coil spring is brought into contact with a member arranged at the outside of the rotation member in the diameter direction due to the centrifugal force, resulting in that friction force is generated between the coil spring and the rotation member. Therefore, the energy stored by the coil spring is reduced due to the stress based upon the centrifugal force or the friction force, upon the absorption of the torque variation. Specifically, the energy that can be stored by the coil spring is reduced, as the centrifugal force increases. The centrifugal force increases in proportion to the mass and the rotation radius of the coil spring. Therefore, when the energy that can be stored by the coil spring is intended to be increased, the centrifugal force increases, which might increase the stress or the friction force, and hence, the energy that can be stored might be reduced.

In view of the above-mentioned circumstance, the present invention aims to provide a damper device that can reduce an influence caused by centrifugal force.

Solution to Problem

In order to solve the above mentioned problem and achieve the object, a damper device includes a first rotation member coupled to a power source; a second rotation member coupled to a drive member driven by power generated from the power source and capable of rotating relative to the first rotation member; and a coiled elastic member configured to transmit the power between the first rotation member and the second rotation member, and absorb a torque variation between the first rotation member and the second rotation member, wherein the coiled elastic member has an internal area and an outer area on a cross-sectional shape on a plane including a centerline of the coiled elastic member, the internal area having lower rigidity and lower density than those of the outer area.

In the damper device, it is preferable that the coiled elastic member is a coil spring, and the internal area is a hollow portion formed in a wire composing the coil spring.

In the damper device, it is preferable that a thickness of a portion of the wire in the radius direction of the coil spring is larger than a thickness of a portion of the wire in the direction of a centerline of the coil spring, on a cross-sectional shape on a plane including the centerline of the coil spring.

In the damper device, it is preferable that the internal area of the elastic member on both ends in the direction of the centerline is smaller than the inner diameter area on a central part of the elastic member.

In the damper device, it is preferable that the internal area of the coiled elastic member on an inner side in the radius direction in the radius direction of the rotation member is smaller than the inner-diameter area of the coiled elastic member on an outer side in the radius direction.

In the damper device, it is preferable that the elastic member is held by the rotation member by a structure in which a concave portion formed on both ends in the direction of the centerline is engaged with a convex portion formed on the rotation member.

In order to solve the above mentioned problem and achieve the object, a damper device includes a first rotation member coupled to a power source; a second rotation member coupled to a drive member driven by power generated from the power source, and capable of rotating relative to the first rotation member; and a coiled elastic member configured to transmit the power between the first rotation member and the second rotation member, and absorb a torque variation between the first rotation member and the second rotation member, wherein the coiled elastic member has an internal area and an outer area on a cross-sectional shape on a plane including a centerline of the coiled elastic member, and at least a density of the internal area is less than a density of the outer area.

Advantageous Effects of Invention

In the damper device according to the present invention, the internal area of the coiled elastic member has lower density than the outer area (the density of the internal area is less than the density of the outer area) on the cross-sectional shape on a plane including the centerline of the coil spring, whereby the damper device provides effects of reducing the weight of the coiled elastic member, and reducing the influence caused by the centrifugal force.

DESCRIPTION OF EMBODIMENTS

The present invention will be described below in detail with reference to the drawings. The present invention is not limited to the embodiments described below. The components in the embodiments described below include those easily supposed by a person skilled in the art, or those substantially equivalent.

First Embodiment

Figure 1:
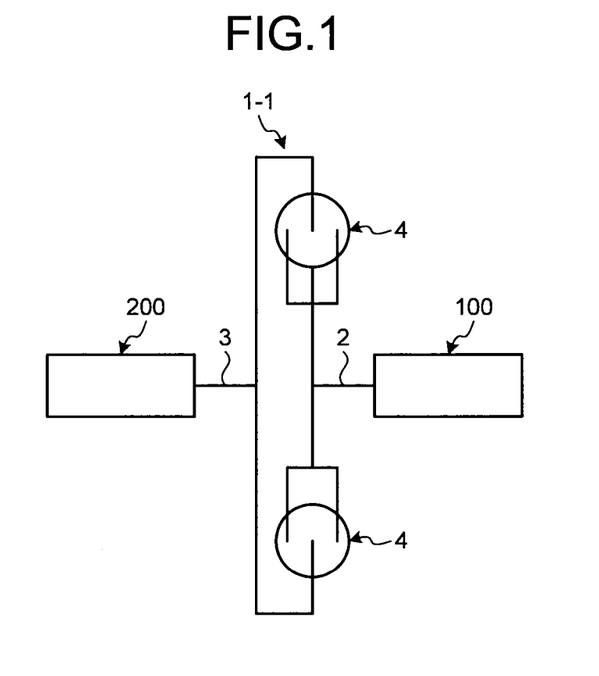
FIG. 1 is a view illustrating an example of a schematic configuration of a damper device according to a first embodiment.
Figure 2:
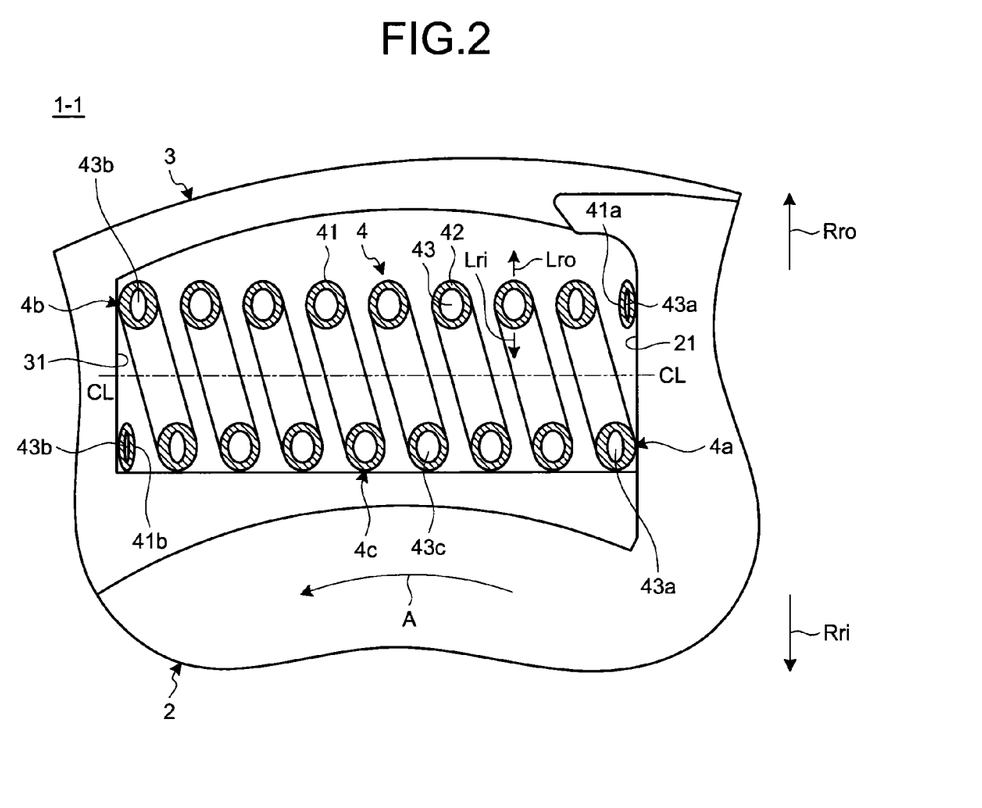
FIG. 2 is a view illustrating a coil spring used in the damper device according to the first embodiment.
Figure 3:
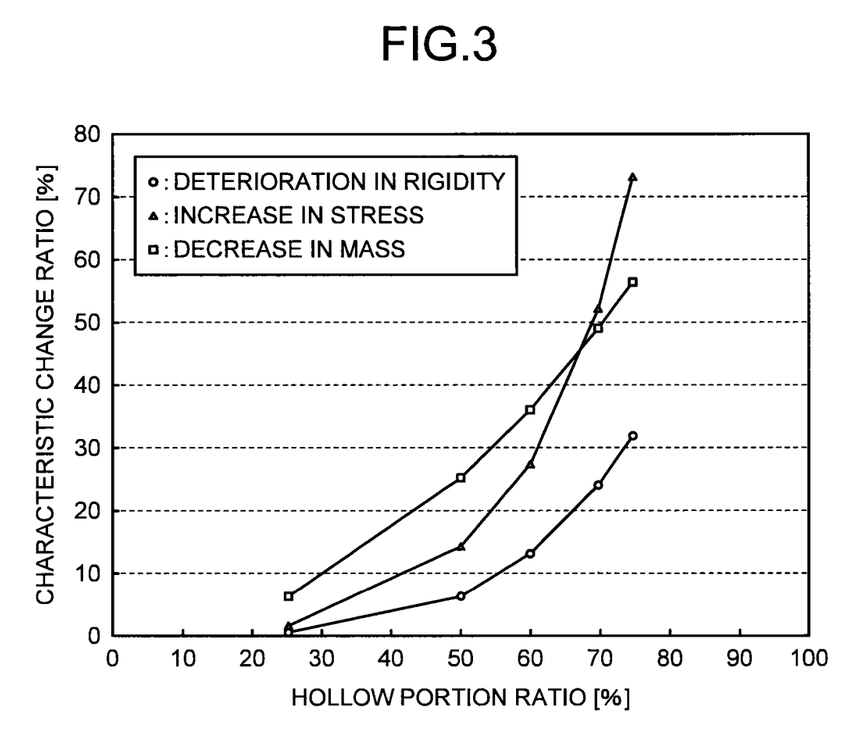
FIG. 3 is a view illustrating a relationship between a characteristic change and a hollow portion.
Figure 4:
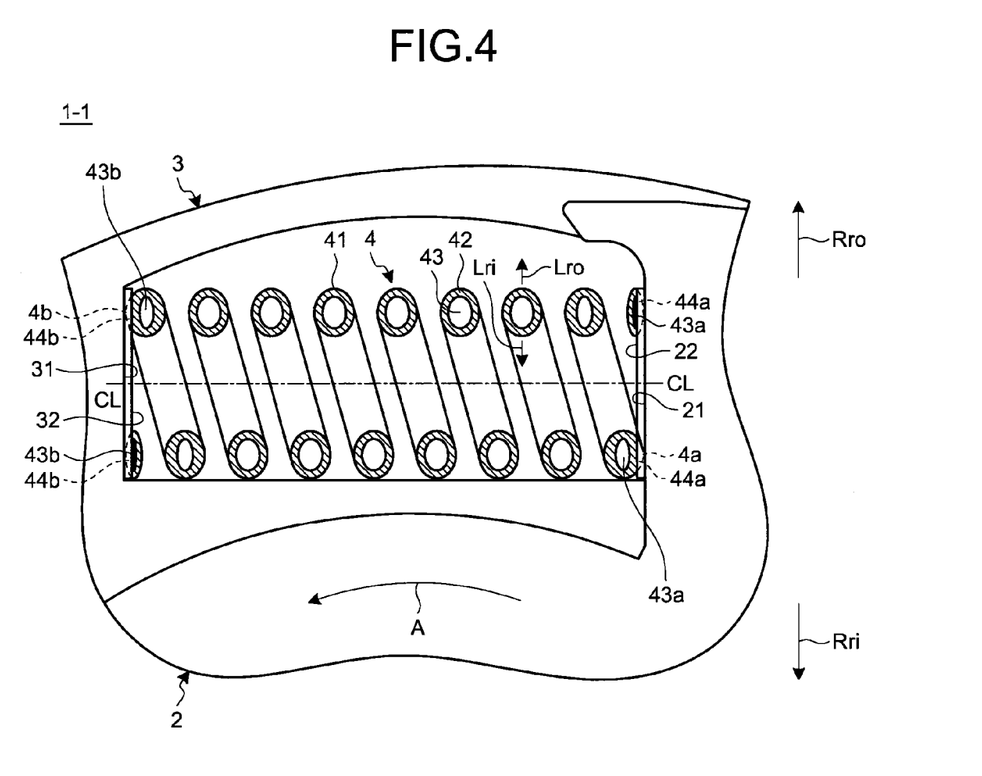
FIG. 4 is a view illustrating a coil spring according to a first modification.
Figure 5:
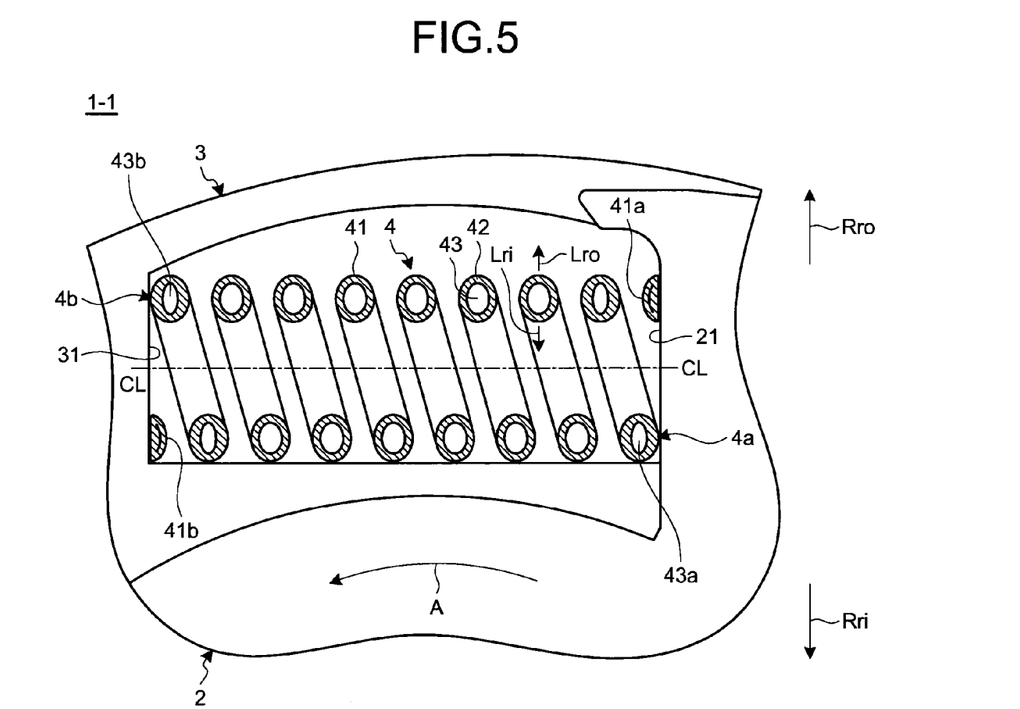
FIG. 5 is a view illustrating a coil spring according to a second modification.
Figure 6:
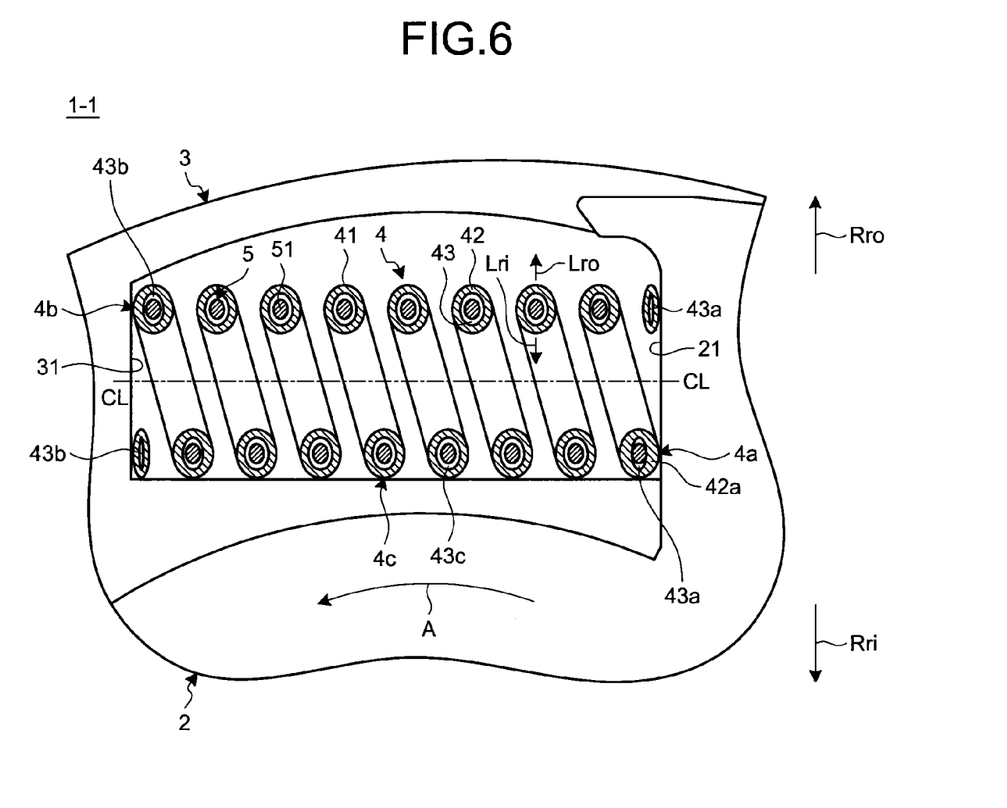
FIG. 6 is a view illustrating a coil spring according to a third modification.

FIG. 1 is a view illustrating a part of an example of a schematic configuration of a damper device according to a first embodiment. FIG. 2 is a view illustrating a coil spring used in the damper device according to the first embodiment. FIG. 3 is a view illustrating a relationship between a characteristic change and a hollow portion. FIG. 4 is a view illustrating a coil spring according to a first modification. FIG. 5 is a view illustrating a coil spring according to a second modification. FIG. 6 is a view illustrating a coil spring according to a third modification. As illustrated in FIGS. 1 and 2, a damper device 1-1 according to the present embodiment includes a first rotation member 2, a second rotation member 3, and plural coil springs 4. In the figures, CL is a centerline of the coil spring 4, Rro is an outside of the rotation member (first rotation member 2, second rotation member 3) in the radius direction, Rri is an inside of the rotation member in the radius direction, Lro is an outside of the coil spring 4 in the radius direction, and Lri is an inside of the coil spring 4 in the radius direction.

The first rotation member 2 is supported so as to be rotatable by a bearing not illustrated. The first rotation member 2 is coupled so as to be integrally rotatable with an output shaft of the power source, which is an engine 100 in the present embodiment. As illustrated in FIG. 2, the first rotation member 2 has plural contact surfaces 21 in the circumferential direction, each contact surface being in contact with one end 4a of both ends of each coil spring 4 in the CL direction at Rro. The power source is not limited to the one, such as the engine 100, which converts fuel energy into a mechanical work through the combustion of the fuel, but may be the one, such as an electric motor, which converts electric energy into the mechanical work.

The second rotation member 3 is supported so as to be rotatable by a bearing not illustrated. The second rotation member 3 is coaxial with the first rotation member 2, and is supported to be relatively rotatable with respect to the first rotation member 2. The second rotation member 3 is coupled to be integrally rotatable with an input shaft of a drive member that is driven by the power generated from the engine 100, i.e., an input shaft of a transaxle 200 coupled to a drive wheel not illustrated in the present embodiment. The second rotation member 3 has plural contact surfaces 31 in the circumferential direction, each contact surface being in contact with the other end 4b of both ends of each coil spring 4 in the CL direction at Rri. The transaxle 200 is configured to include at least one or more of a torque converter, a transmission, a clutch, a forward/backward movement switching device, a power transmission mechanism, and a differential gear.

The coil spring 4 is an elastic member having a coil shape. As illustrated in FIG. 2, the coil spring 4 is arranged between the first rotation member 2 and the second rotation member 3, which can relatively rotate, such that one end 4a is in contact with the contact surface 21 and the other end 4b is in contact with the contact surface 31. When the first rotation member 2 to which the power generated from the engine 100 is transmitted rotates in a direction of an arrow A in FIG. 2, the second rotation member 3 rotates in the direction of the arrow A by the power transmitted through the coil spring 4. Specifically, the coil spring 4 transmits power between the first rotation member 2 and the second rotation member 3. Since the coil spring 4 can compress and extend between the contact surface 21 and the contact surface 31, it can absorb a torque variation between the first rotation member 2 and the second rotation member 3, i.e., between two rotation members. The coil spring 4 absorbs the torque variation caused by the power generated from the engine 100 in a power transmission path of the power generated from the engine 100.

The coil spring 4 is formed such that an internal area has lower rigidity and lower density than an outer area on a cross-sectional shape on a plane including the CL (hereinafter merely referred to as "CL cross-sectional shape"). The outer area is an area including an outer peripheral line of the coil spring 4 on the CL cross-sectional shape, and the internal area is an area enclosed by the outer area. In the present embodiment, the coil spring 4 is composed of a wire 41 made of a material containing iron such as steel. The rigidity of the internal area and the outer area means the rigidity of a material constituting the internal area and the outer area. The CL cross-sectional area of the wire 41 is preferably circular or elliptic, but may be polygonal. The wire 41 has a hollow portion 43. Specifically, the wire 41 has an outline portion 42 corresponding to the outer area, and the hollow portion 43 corresponding to the internal area on the CL cross-sectional shape. The CL cross-sectional shape of the hollow portion 43 is preferably circular or elliptic, but may be polygonal. In the present embodiment, since the hollow portion 43 is not closed by both ends 4a and 4b of the coil spring 4 in the CL direction, the hollow portion 43 has an environment same as the ambient environment. For example, when air is present in the ambient environment, air is also present in the hollow portion 43. Therefore, the hollow portion 43 has lower rigidity and lower density with respect to the outline portion 42, so that the internal area has lower rigidity and lower density than the outer area.

As described above, in the damper device 1-1 according to the present embodiment, the outline portion 42 of the wire 41 that forms the coil spring 4 has higher rigidity than the hollow portion 43, whereby the torsional rigidity and strength required as the coil spring 4 can be secured by the outline portion 42 of the wire 41. Since the hollow portion 43 of the wire 41 has lower density than the outline portion 42, the mass of the coil spring 4 can be reduced, and hence, the reduction in the energy, which can be stored, caused by the centrifugal force can be suppressed. Thus, the influence caused by the centrifugal force can be reduced, while maintaining the equivalent performance, compared to a coil spring that has the same rigidity and same density over the total area on the CL cross-sectional shape. Therefore, the performance of reducing the vibration caused by the engine 100, which performance is the function as the damper device 1-1, can be enhanced. Specifically, the damper device 1-1 can operate the engine 100 in a low-rotation high-load area where the vibration is very high but fuel efficiency is good, whereby the fuel efficiency can be enhanced.

Since the coil spring 4 is hollow having the hollow portion 43 in the damper device 1-1 in the present embodiment, it is unnecessary to provide, as the internal area, a member having lower rigidity and lower density with respect to the outer area. Therefore, cost can be reduced. When excessive torque is inputted to the damper device 1-1, the coil spring 4 is excessively compressed, which might cause an adhesion of the wire 41 that is separated in the CL direction. When the wire 41 is adhered, the coil spring 4 cannot store energy, so that high shock load might be inputted. However, since the coil spring 4 has the hollow portion, the rigidity of the internal area can significantly be reduced. Therefore, the total rigidity of the adhered wire 41 can be reduced. Accordingly, the shock load can be reduced, whereby durability can be enhanced.

The coil spring 4 is formed such that hollow portions 43a and 43b on both ends 4a and 4b in the CL direction are formed to be smaller than a hollow portion 43c on a central part 4c in the CL direction. Specifically, the hollow portions 43a and 43b at both ends 4a and 4b are formed to smaller than the hollow portion on the central part 4c. In the present embodiment, the widths of the hollow portions 43a and 43b on both ends 4a and 4b in the CL direction are formed to be smaller than the width of the hollow portion 43c on the central part 4c in the CL direction. Accordingly, the torsional rigidity becomes higher on both ends 4a and 4b than on the central part 4c. Specifically, the torsional rigidity of the coil spring 4 is different in the CL direction. Even if the torsional rigidity is high on both ends 4a and 4b, the high rigidity gives less influence to the performance of the coil spring 4, whereby formability can be enhanced, i.e., the turn-to-turn space of the wire 41 on both ends 4a and 4b is decreased. The wire 41 is less deformed on both ends 4a and 4b, since the torsional rigidity is high on both ends 4a and 4b, so that the contact state with the contact surfaces 21 and 31 can be stabilized. Therefore, the durability can be enhanced. In the present embodiment, the wire 41 is formed such that the width in the CL direction is decreased on both ends 4a and 4b toward both ends 41a and 41b, and similarly, the width of each of the hollow portions 43a and 43b on both ends 4a and 4b in the CL direction is decreased toward both ends 41a and 41b. Not only the hollow portions 43a and 43b on both ends 4a and 4b, but also the hollow portion in the vicinity of both ends 4a and 4b are formed to be smaller than the hollow portion 43c on the central part 4c in the CL direction. The width on both ends 4a and 4b in the CL direction is formed to be smaller than the width of the central part 4c in the CL direction.

It is preferable that the coil spring 4 used in the damper device 1-1 is formed in such a manner that the diameter of the wire 41 (when the cross-sectional shape of the wire 41 in the CL direction is not a circle, but an ellipse, for example, an average diameter) is about 1 mm to 10 mm, the outer diameter of the coil is about 5 mm to 50 mm, and a free length of the coil spring 4 (the length on the CL) is about 10 mm to 600 mm. When the cross-sectional shape of the wire 41 on the CL is elliptic, it is preferable that a major diameter is within a size 2.5 times a short diameter. The ratio [%] of the hollow portion 43 with respect to a diameter D of the wire 41 is preferably 75% or less considering the deterioration in the rigidity, and 25% or more considering the decrease in the mass. A ratio [%] of a characteristic change (hereinafter merely referred to as "characteristic change ratio") caused by the change in the ratio [%] (hereinafter merely referred to as "hollow portion ratio") of the hollow portion 43 with respect to the diameter D of the wire 41 of the coil spring 4, in which the diameter of the wire 41 is 4 mm, the outer diameter of the coil is 20 mm, the effective turn is 10, and the free length of the coil spring 4 is 50 mm, will be described with reference to FIG. 3. The characteristic change means a change in the decrease of the mass, a change in the increase of stress, and a change in the deterioration of rigidity. In the change in the decrease of the mass (a line linking rectangle points in FIG. 3), the mass is decreased as the ratio increases. In the increase of stress (a line linking triangle points in FIG. 3), stress increases as the ratio increases. In the change in the deterioration of the rigidity (a line linking circular points in FIG. 3), the rigidity deteriorates as the ratio increases. As illustrated in FIG. 3, with the increase in the ratio of the hollow portion, the decrease in the mass increases, so that the mass of the coil spring 4 is reduced. With the decrease in the ratio of the hollow portion, the increase in stress is reduced, so that the stress of the coil spring 4 is reduced. With the decrease in the ratio of the hollow portion, the ratio of the deterioration of the rigidity is decreased, so that the torsional rigidity of the coil spring 4 is enhanced. The hollow portion ratio is preferably set such that the effect of the decrease of the mass exceeds the effect of suppressing the increase of the stress and the effect of suppressing the deterioration of the rigidity, i.e., such that the line linking the rectangular points is located above the line linking the triangle points and the line linking the circular points in FIG. 3. Accordingly, the hollow portion ratio in the coil spring 4 that is one example in the present embodiment is preferably set as 68% or less.

[First Modification]

In the present embodiment, both ends 4a and 4b are merely in contact with the contact surfaces 21 and 31 respectively. However, the coil spring 4 may be supported by the rotation members through a concavo-convex engagement as in the first modification. In this case, a convex portion 22 projecting toward the opposite contact surface 31 is formed on the contact surface 21. A convex portion 32 projecting toward the opposite contact surface 21 is formed on the contact surface 31. The wire 41 on both ends 4a is formed with two concave portions 44a, which are opposite to the convex portion 22, and into which the convex portion 22 is inserted with the coil spring 4 being arranged between the contact surfaces 21 and 31. The wire 41 on both ends 4b is formed with two concave portions 44b, which are opposite to the convex portion 32, and into which the convex portion 32 is inserted with the coil spring 4 being arranged between the contact surfaces 21 and 31. When the coil spring 4 is arranged between the contact surfaces 21 and 31, the convex portion 22 is inserted into the two concave portions 44a, and the convex portion 32 is inserted into the two concave portions 44b. Therefore, the rotation of the coil spring 4 about the CL with respect to the contact surfaces 21 and 31 is restricted. Thus, the coil spring 4 is stably supported, so that the performance of the coil spring 4 can be enhanced. Since the hollow portions 43a and 43b are formed on both ends 4a and 4b formed with the concave portions 44a and 44b, the concave portions 44a and 44b can easily be processed and formed. The shape of the convex portions 22 and 32 and the concave portions 44a and 44b are not limited to the shape in the present embodiment, so long as both ends 4a and 4b are engaged with the contact surfaces 21 and 31 through the concavo-convex engagement. For example, any shape may be employed, so long as the rotation of the coil spring 4 about the CL with respect to the contact surfaces 21 and 31 can be restricted.

[Second Modification]

In the present embodiment, the hollow portion 43 is open on both ends 41a and 41b of the wire 41, and communicates with the outside. However, as illustrated in the second modification in FIG. 5, both ends 41a and 41b of the wire 41 may be closed. Specifically, both ends 41a and 41b of the wire 41 may be made solid. With this structure, the hollow portion 43 becomes a sealed space, whereby a gas having a property different from the gas present at the outside of the coil spring 4, liquid, or solid such as a granular substance or powder substance can be inserted into the hollow portion 43. Since the hollow portion 43 of the wire 41 becomes a sealed space, a vacuum can be created in the hollow portion 43.

[Third Modification]

In the present embodiment, only air is present in the hollow portion 43. However, an auxiliary coil spring 5 may be inserted as in the third modification illustrated in FIG. 6. The auxiliary coil spring 5 is composed of a wire 51 made of a material containing iron such as steel, for example. The auxiliary coil spring 5 is formed with the CL of the coil spring 4 being defined as a centerline. The wire 51 is formed such that the cross-sectional shape in a plane containing the CL is smaller than the CL cross-sectional shape of the hollow portion 43c on the central part 4c. Thus, the auxiliary coil spring 5 can move in the hollow portion 43 with the compression and extension of the coil spring 4, and the auxiliary coil spring 5 can compress and extend in the coil spring 4. Therefore, two coil springs, each having almost the same diameter, can be arranged between the contact surfaces 21 and 31. Accordingly, the performance of the auxiliary coil spring 5 can be enhanced more, compared to the case where the auxiliary coil spring 5 is inserted at the side of the inner diameter of the coil spring 4.

In this case, it is preferable that the auxiliary coil spring 5 is supported by the coil spring 4 in such a manner that the wire 51 is fixed to the wire 41 on either one of both ends 4a and 4b. For example, as illustrated in FIG. 6, the wire 51 located on one end 4a is nipped by an opposing outline portion 42a at one end 4a in the CL direction by utilizing the situation that the width of the hollow portion 43a in the CL direction on one end 4a is smaller than the width of the hollow portion 43c in the CL direction on the central part 4c. Thus, the wire 51 is fixed to the wire 41 on one end 4a. Accordingly, the auxiliary coil spring 5 can easily be positioned to the coil spring 4.

Second Embodiment

Figure 7:
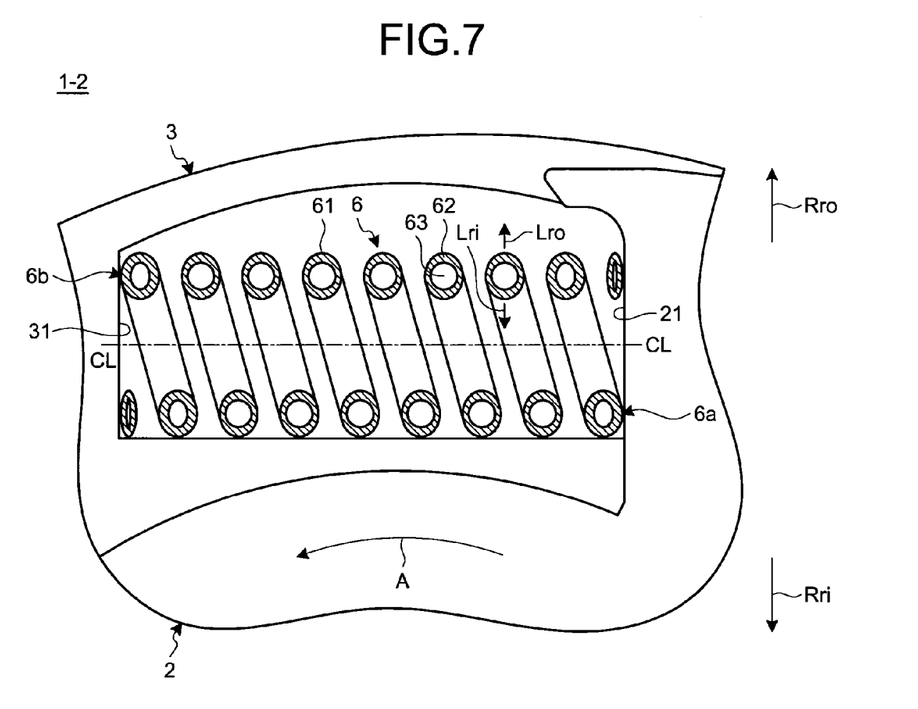
FIG. 7 is a view illustrating a coil spring used in a damper device according to a second embodiment.
Figure 8:
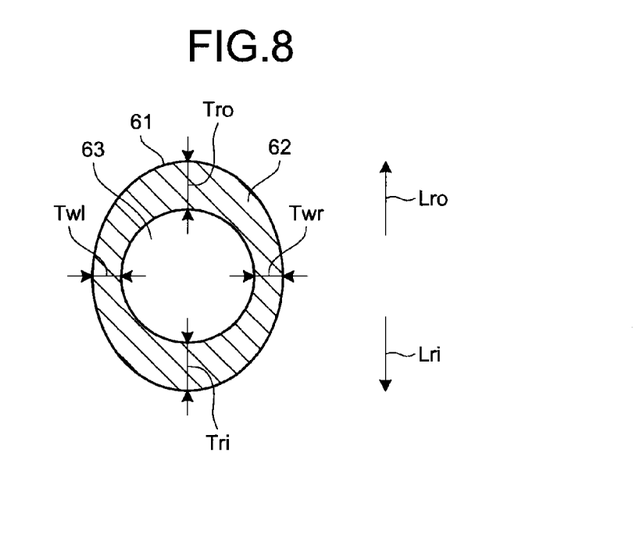
FIG. 8 is a view illustrating a CL cross-sectional shape of the coil spring.
Figure 9:
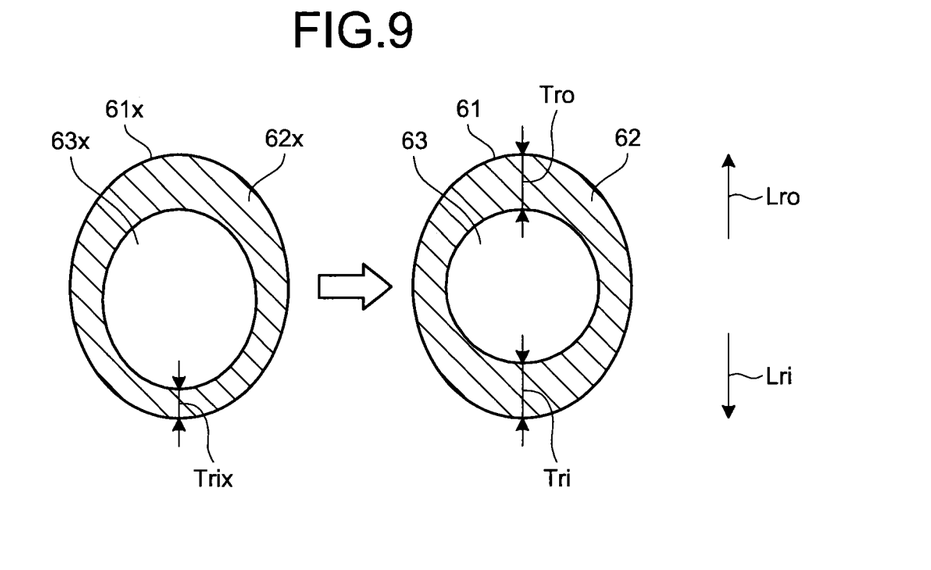
FIG. 9 is a view illustrating a change in a cross-sectional shape upon a production of the coil spring.
Figure 10:
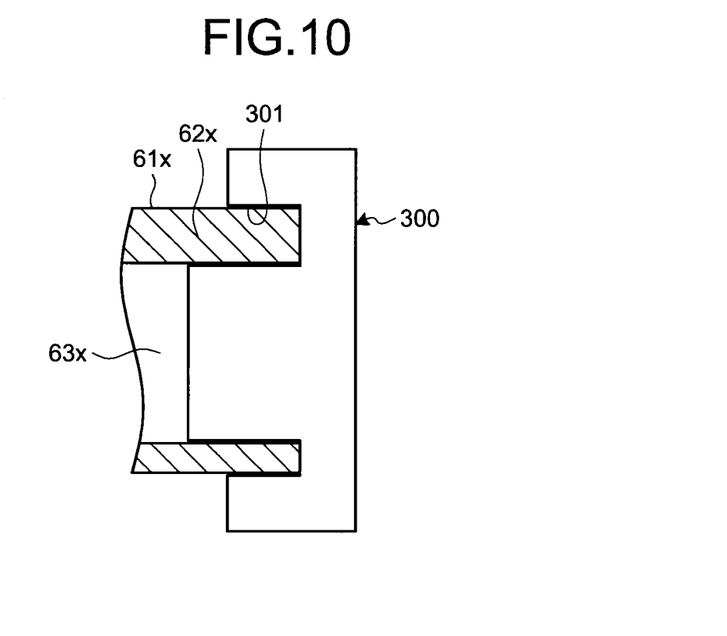
FIG. 10 is a view illustrating a jig used during the production of the coil spring.

A damper device according to a second embodiment will subsequently be described. FIG. 7 is a view illustrating a coil spring used in the damper device according to the second embodiment. FIG. 8 is a view illustrating a CL cross-sectional shape of the coil spring. FIG. 9 is a view illustrating a change in a cross-sectional shape upon a production of the coil spring. FIG. 10 is a view illustrating a jig used during the production of the coil spring. A damper device 1-2 according to the second embodiment illustrated in FIG. 7 is different from the damper device 1-1 according to the first embodiment in the CL cross-sectional shape of a wire 61. The first to third modifications can be applied to the damper device 1-2 according to the second embodiment.

A coil spring 6 is an elastic member having a coil shape as illustrated in FIGS. 7 and 8. Since the wire 61 has a hollow shape, the internal area has lower rigidity and lower density than the outer area on the CL cross-sectional shape. The coil spring 6 is formed such that, on the CL cross-sectional shape, a thickness of the portion in the radius direction, i.e., a thickness Tri of a portion at Lri and a thickness Tro of a portion on Lro, are larger than thicknesses Twl and Twr of portions in the CL direction. In the present embodiment, the portion of the coil spring 6 in the radius direction is defined as the thickness Tri and the thickness Tro. However, it may be either one of the thickness Tri and the thickness Tro.

As described above, since the thicknesses Tri and Tro are larger than the thicknesses Twl and Twr on the CL cross-sectional shape of the coil spring 6 in the damper device 1-2 according to the present embodiment, the rigidity of the portion in the radius direction of the coil spring 6 is higher than the rigidity of the portion of the wire 61 in the CL direction. When the wire 61 before being shaped is wound in the coil shape, the rigidity of the portion of the wire 61 in the CL direction becomes high, and the rigidity of the portion of the coil spring 6 in the radius direction becomes low with respect to the load applied upon winding the wire 61 in the coil shape. Therefore, if the rigidity of the portion of the coil spring 6 in the radius direction is low, a large deformation is generated upon winding the wire 61 in the coil shape, which deteriorates formability. However, since the rigidity of the portion of the coil spring 6 in the radius direction is higher than the rigidity of the portion of the wire 61 in the CL direction, the formability upon forming the wire 61, which has not yet been formed, into the coil spring 6 can be enhanced. When the coil spring 6 is compressed, the stress on the portion on Lro is higher than the other portion. Since the thickness of the portion on Lro can be increased, the strength can be enhanced. Since the rigidity of the portion of the wire 61 in the CL direction is lower than the rigidity of the portion of the coil spring 6 in the radius direction, the rigidity of the adhered portion in the CL direction can be reduced in a state in which the wire 61 is adhered. Accordingly, a shock load can be reduced, whereby durability can be enhanced.

As illustrated in FIG. 9, it is preferable that a thickness Trix of a portion on Lri of a wire 61x, which has not yet been formed, is formed to be small in order that the thickness Tri of the portion on Lri of the wire 61 after the shaping becomes a predetermined thickness. When the wire 61x that has not yet been formed is formed into the coil spring 6, the portion on Lri of the wire 61x is compressed, so that the thickness Tri of the portion of the wire 61 on Lri becomes larger than the thickness Trix of the wire 61x. For example, the thickness Tri of the portion on Lri is formed to be small by changing the CL cross-sectional shape of a hollow portion 63x with respect to an outline portion 62x of the wire 61x. Therefore, the thickness Tri of the portion of the formed wire 61 on Lri can be adjusted to be a predetermined thickness (for example, the thickness same as the thickness Tro of the portion on Lro), whereby the performance of the coil spring 6 can be enhanced. When the wire 61x, which has not yet been formed, is formed into the coil spring 6, a jig 300 formed with an insertion hole 301 into which the wire 61x is inserted is used as illustrated in FIG. 10. In this case, since the thickness Tri of the portion of the wire 61x on Lri is thin (e.g., is smaller than the thickness of the portion on Lro), so that the thickness of the outline portion 62x is non-uniform, the wire 61x, which has not yet been formed, can easily be positioned on the jig 300. In addition, the distortion of the wire 61x, which has not yet been formed, to the jig 300 can be restricted, whereby productivity can be enhanced.

Third Embodiment

Figure 11:
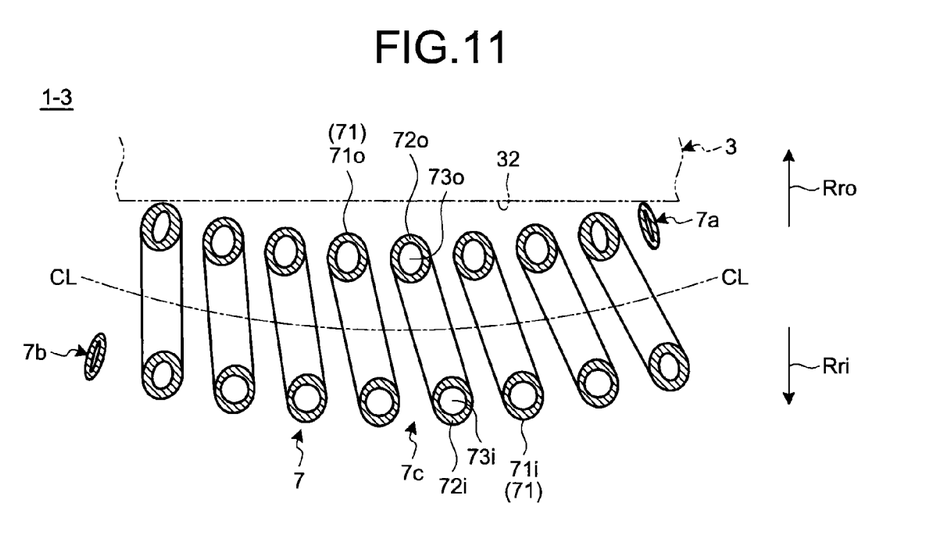
FIG. 11 is a coil spring used in a damper device according to a third embodiment.
Figure 12:
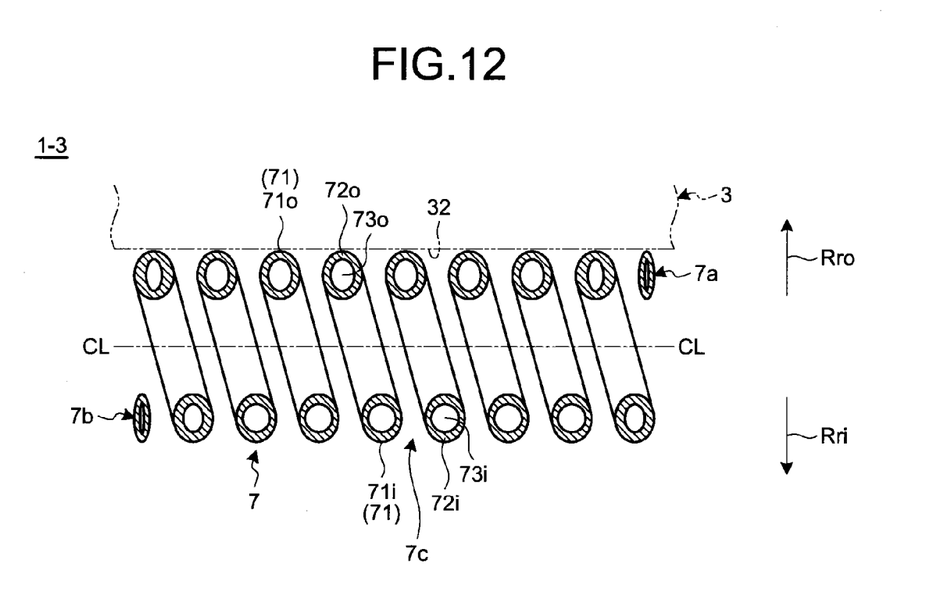
FIG. 12 is a view illustrating an arrangement state of the coil spring.

Subsequently, a damper device according to a third embodiment will be described. FIG. 11 is a view illustrating a coil spring used in the damper device according to the third embodiment. FIG. 12 is a view illustrating an arrangement state of the coil spring. A damper device 1-3 according to the third embodiment illustrated in FIG. 11 is different from the damper device 1-1 according to the first embodiment in the CL cross-sectional shape of a wire 71. The first to third modifications can be applied to the damper device 1-3 according to the third embodiment.

A coil spring 7 is an elastic member having a coil shape as illustrated in FIG. 11. Since the wire 71 has a hollow shape, the internal area has lower rigidity and lower density than the outer area on the CL cross-sectional shape. In the coil spring 7, the CL cross-sectional shape of a wire 71o on Rro and the CL cross-sectional shape of a wire 71i on Rri are different from each other. In the coil spring 7, a hollow portion 73i of the wire 71i is smaller than a hollow portion 73o of the wire 71o, so that a thickness of an outline portion 72i of the wire 71i is larger than a thickness of an outline portion 72o. Therefore, the rigidity of the wire 71i is higher than the rigidity of the wire 71o, whereby the torsional rigidity on Rri of the coil spring 7 becomes higher than the torsional rigidity on Rro. Specifically, the coil spring 7 is difficult to be deformed on Rri, but easy to be deformed on Rro. As illustrated in FIG. 11, when external force is not applied to the coil spring 7, a central part 7c is deformed toward Rri with both ends 7a and 7b defined as a reference. Therefore, as illustrated in FIG. 12, when the coil spring 7 is arranged between the contact surfaces 21 and 31, the coil spring 7 is deformed toward Rro in order that the CL becomes linear, for example. In this case, the coil spring 7 keeps the state that the coil spring 7 tries to return to the state where the external force is not applied, i.e., keeps the state that the coil spring 7 tries to deform toward Rri. Therefore, when a member that might be in contact with the coil spring 7, which is arranged between the contact surfaces 21 and 31, on Rro is present, e.g., when a member 32 is provided on the second rotation member 3 with respect to the coil spring 7 on Rro, the rotation of the rotation member causes centrifugal force on the coil spring 7, and even when the coil spring 7 tries to deform toward Rro, friction force generated between the coil spring 7 and the member 32 can be reduced, since the coil spring 7 keeps the state that the coil spring 7 tries to deform toward Rri as described above. This can prevent that the energy that can be stored by the coil spring 7 becomes small, thereby being capable of reducing an influence caused by the centrifugal force. Specifically, the deterioration in the performance of the coil spring 7 can be suppressed. When the CL of the coil spring 7 is linear, stress generated on the coil spring 7 on Rri by the centrifugal force is larger than the stress on Rro. In the coil spring 7, the thickness of the outline portion 72i of the wire 71i is larger than the thickness of the outline portion 72o of the wire 71o. Specifically, in the coil spring 7, the thickness of the outline portion 72i on the position where the stress becomes large is increased, whereby the coil spring 7 can improve the durability. Since the thickness of the outline portion 72o of the wire 71o is smaller than the thickness of the outline portion 72i of the wire 71i in the coil spring 7, the weight can be reduced, and the influence caused by the centrifugal force can be reduced.

In the above-mentioned embodiments 1 to 3, the coil springs 4, 6, and 7 are formed such that, on the CL cross-sectional shape, the internal area has lower rigidity and lower density than the outer area, i.e., the density of the internal area is less than the density of the outer area, and the rigidity of the internal area is less than the rigidity of the outer area, but the invention is not limited thereto. For example, the coil springs 4, 6, and 7 may be formed such that the density of the internal area is less than the density of the outer area, and the rigidity of the internal area and the rigidity of the outer area are equivalent to each other.

INDUSTRIAL APPLICABILITY

As described above, the damper device is useful for a damper device arranged on a power transmission path of a vehicle, and well adaptable to reduce the influence caused by centrifugal force.

REFERENCE SIGNS LIST 1-1 to 1-3 Damper Device
2 First Rotation Member
21 Contact Surface
3 Second Rotation Member
31 Contact Surface
4, 6, 7 Coil Spring
4a, 6a, 7a One End
4b, 6b, 7b Other End
4C, 7C Central Part
41, 61, 71, 71i, 71o Wire
42, 62, 72i, 72o Outline Portion
43, 63, 73i, 73o Hollow Portion
100 Engine
300 Jig
301 Insertion Hole

The invention claimed is:
1. A damper device comprising:
a first rotation member coupled to a power source;
a second rotation member coupled to a drive member driven by power generated from the power source and capable of rotating relative to the first rotation member; and
a coiled elastic member configured to transmit the power between the first rotation member and the second rotation member, and absorb a torque variation between the first rotation member and the second rotation member, wherein
the coiled elastic member has an internal area and an outer area on a cross-sectional shape on a plane including a centerline of the coiled elastic member, the internal area having lower rigidity and lower density than those of the outer area, an internal area of the coiled elastic member on both ends in a direction of the centerline is smaller than an internal area on a central part of the coiled elastic member, and widths of the internal area of the coiled elastic member on both ends in the direction of the centerline are formed to be smaller than a width of the internal area on the central part of the coiled elastic member.

2. The damper device according to claim 1, wherein
the coiled elastic member is a coil spring, and
the internal area is a hollow portion formed in a wire composing the coil spring.

3. The damper device according to claim 2, wherein
a thickness of a portion of the wire in the radius direction of the coil spring is larger than a thickness of a portion of the wire in the direction of a centerline of the coil spring, on a cross-sectional shape on a plane including the centerline of the coil spring.

4. The damper device according to claim 3, wherein
the internal area of the coiled elastic member on both ends in the direction of the centerline is smaller than the internal area on a central part of the elastic member.

5. The damper device according to claim 3, wherein
the internal area of the coiled elastic member on an inner side in the radius direction in the radius direction of the first and second rotation members is smaller than the internal area of the coiled elastic member on an outer side in the radius direction.

6. The damper device according to claim 3, wherein
the coiled elastic member is held by the first and second rotation members by a structure in which a concave portion formed on both ends in the direction of the centerline is engaged with a convex portion formed on the first rotation member and the second rotation member.

7. The damper device according to claim 2, wherein
the internal area of the coiled elastic member on both ends in the direction of the centerline is smaller than the internal area on a central part of the elastic member.

8. The damper device according to claim 2, wherein
the internal area of the coiled elastic member on an inner side in the radius direction in the radius direction of the first and second rotation members is smaller than the internal area of the coiled elastic member on an outer side in the radius direction.

9. The damper device according to claim 2, wherein
the coiled elastic member is held by the first and second rotation members by a structure in which a concave portion formed on both ends in the direction of the centerline is engaged with a convex portion formed on the first rotation member and the second rotation member.

10. The damper device according to claim 1, wherein
the internal area of the coiled elastic member on an inner side in the radius direction in the radius direction of the first and second rotation members is smaller than the internal area of the coiled elastic member on an outer side in the radius direction.

11. The damper device according to claim 1, wherein
the coiled elastic member is held by the first and second rotation members by a structure in which a concave portion formed on both ends in the direction of the centerline is engaged with a convex portion formed on the first rotation member and the second rotation member.

12. The damper device according to claim 1, further comprising:
an auxiliary coil spring, wherein
the coiled elastic member is a coil spring,
the internal area is a hollow portion formed in a wire composing the coil spring, and
the auxiliary coil spring is inserted in the hollow portion.

13. The damper device according to claim 1, wherein the internal area of the coiled elastic member on an inner side of the centerline in the radius direction of the first and second rotation members is smaller than the internal area of the coiled elastic member on an outer side of the centerline in the radius direction.

14. A damper device comprising:
a first rotation member coupled to a power source;
a second rotation member coupled to a drive member driven by power generated from the power source, and capable of rotating relative to the first rotation member; and
a coiled elastic member configured to transmit the power between the first rotation member and the second rotation member, and absorb a torque variation between the first rotation member and the second rotation member, wherein
the coiled elastic member has an internal area and an outer area on a cross-sectional shape on a plane including a centerline of the coiled elastic member, and at least a density of the internal area is less than a density of the outer area,
an internal area of the coiled elastic member on both ends in a direction of the centerline is smaller than an internal area on a central part of the coiled elastic member, and
widths of the internal area of the coiled elastic member on both ends in the direction of the centerline are formed to be smaller than a width of the internal area on the central part of the coiled elastic member.

15. A damper device comprising:
a first rotation member coupled to a power source;
a second rotation member coupled to a drive member driven by power generated from the power source and capable of rotating relative to the first rotation member; and
a coiled elastic member configured to transmit the power between the first rotation member and the second rotation member, and absorb a torque variation between the first rotation member and the second rotation member, wherein
the coiled elastic member has an internal area and an outer area on a cross-sectional shape on a plane including a centerline of the coiled elastic member, the internal area having lower rigidity and lower density than those of the outer area, and
an internal area of the coiled elastic member on an inner side of the centerline in a radius direction of the first and second rotation members is smaller than an internal area of the coiled elastic member on an outer side of the centerline in the radius direction.

\* \* \* \* \*